United States Patent [19]

Chandler

[11] Patent Number: 4,672,047

[45] Date of Patent: Jun. 9, 1987

[54] MERCAPTAN OXIDATION CATALYST

[76] Inventor: Travis Chandler, 3325 Nasa Road One, No. 25, Seabrook, Tex. 77586

[21] Appl. No.: 831,172

[22] Filed: Feb. 20, 1986

Related U.S. Application Data

[63] Continuation-in-part of Ser. No. 587,640, Mar. 8, 1984, abandoned.

[51] Int. Cl.$^4$ .............................................. B01J 31/22
[52] U.S. Cl. ..................................... 502/62; 502/160; 502/163; 502/167; 208/196; 208/189
[58] Field of Search ................... 502/62, 160, 163, 167

[56] References Cited

U.S. PATENT DOCUMENTS

| | | | |
|---|---|---|---|
| 3,230,180 | 1/1966 | Larson | 502/163 |
| 4,087,378 | 5/1978 | Carlson | 502/163 |
| 4,364,843 | 12/1982 | Carlson | 502/163 |

FOREIGN PATENT DOCUMENTS

| | | | |
|---|---|---|---|
| 842222 | 5/1970 | Canada | 502/163 |
| 79705 | 5/1983 | European Pat. Off. | 502/163 |

*Primary Examiner*—Patrick P. Garvin

[57] ABSTRACT

A catalyst is disclosed for oxidizing mercaptans to disulfides, or inorganic sulfides to elemental sulfur. The catalytic agent is a compound consisting of a metal atom bonded to a chelate such as phthalocyanine, and also to axial ligands. The compound preferably is composited on an inert granular solid support. The catalyst is an improvement over existing catalysts in that its use does not require basic agents such as caustic.

8 Claims, No Drawings

MERCAPTAN OXIDATION CATALYST

CROSS REFERENCE TO RELATED APPLICATION

This application is a Continuation-in-Part of my co-pending application Ser. No. 587,640, filed Mar. 8, 1984, and now abandoned.

BACKGROUND OF THE INVENTION

1. Field of the Invention

The invention relates to the treatment of sour petroleum distillates. Specifically, the invention relates to a catalyst for sweetening sour petroleum distillates by using an oxometallo chelate catalyst to oxidize mercaptans in the distillates to disulfides. The catalyst may also be used to oxidize inorganic sulfides to elemental sulfur.

2. Description of the Prior Art

Several processes are currently used in the petroleum refining industry to sweeten sour petroleum distillates. Sweetening refers to the oxidation of offensive mercaptans contained in petroleum distillates to disulfides. The objectionable properties of mercaptans include their foul odors, toxicities, and corrosive behavior to metals. Sour petroleum distillates include straight-run gasoline, cracked gasoline, kerosene, jet fuel, naptha, fuel oil, gaseous fractions, and the like.

One type of sweetening process utilizes an oxidizing agent, usually air, and an oxidation catalyst, usually a metal phthalocyanine to sweeten the sour distillates. A general feature of such process is the requirement of a strongly basic medium to effect the oxidation reaction as disclosed in U.S. Pat. No. 2,882,224. In such process, a metal phthalocyanine chelate catalyst is contained in an alkaline aqueous solution, which is contacted with a sour petroleum distillate and air. The oxidation catalyst can be retained in the alkaline aqueous phase by incorporating suitable substituent groups on the phthalocyanine chelate. Thus, suitable catalysts include mono- and polysulfonated metallo phthalocyanines.

Another sweetening process is disclosed in U.S. Pat. No. 2,988,500, wherein a metallo phthalocyanine catalyst is composited on a solid support, such as charcoal, and an oxidizing agent, aqueous caustic solution, and sour petroleum distillate are passed over the composited catalyst.

Another sweetening process is described in U.S. Pat. No. 4,207,173, wherein an organic base, such as tetra-alkyl guanidine, is employed as the basic medium. The guanidine is added to the sour petroleum feed stream, which admixed with air is passed over a metallo phthalocyanine catalyst composited on a carbon carrier.

Another manner by which the sweetening of sour petroleum distillates can be achieved is disclosed by U.S. Pat. No. 4,260,479, wherein the basic medium is provided by a quaternary ammonium hydroxide, which is preferably composited with a metallo phthalocyanine catalyst on a carbon carrier.

The chemistry of hydrogen sulfide, which may be found in the lower boiling or gaseous petroleum fractions, or of alkali-metal salts of sulfides in aqueous solutions, such as sodium sulfide in waste water, is sufficiently similar to mercaptan oxidation chemistry so that petroleum sweetening catalysts have been directly and easily applied to processes that oxidize these inorganic sulfides to elemental sulfur. Hydrogen sulfide and alkali-metal sulfide salts are objectionable for similar reasons as mercaptans, namely their toxicity, foul odor, corrosive tendency, and gum or sludge forming or causing tendency.

In each of the petroleum sweetening processes of the prior art, the catalyst used consists of a metal-chelate compound. The preferred metal in the prior art is cobalt, while the preferred chelate is phthalocyanine or a structurally similar chelate such as porphyrin or tetrapyridinoporphyrazine. The use of porphyrins is described in U.S. Pat. No. 2,966,453 and the use of tetrapyridinoporphyrazines is described in U.S. Pat. No. 3,980,582. These chelates are similar in that all of the atoms of the chelate that are in close proximity to the metal atom are coplanar with the metal atom and each other. Thus, the metal atom is bonded by four nitrogen atoms in a square planar coordination environment. This environment results in catalytic activity of the metal atom. An examination of this square planar structure reveals that there are two additional coordination sites available to the metal atom, neither of which is in the metal-chelate plane. Instead these positions are above and below the metal chelate plane. Ligands at these positions form an axis, together with the metal atom, through and perpendicular to the metal-chelate plane. Such ligands will be referred to as axial ligands.

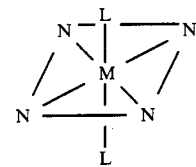

In the prior art the usual catalyst has been a cobalt phthalocyanine compound. This metal chelate generally does not bond to axial ligands, and no use of such axial ligands in petroleum sweetening catalysts has been considered in the prior art.

There are a number of variations of the sweetening process of sour petroleum distillates using a metal phthalocyanine or similar catalysts and a basic environment. The use of a basic environment, however, has been the case of numerous problems such as disclosed in U.S. Pat. No. 4,207,173. These problems include the formation of soaps which plug the charcoal catalyst bed; the contamination of the final distillate product with either sodium hydroxide or water, or both; formation of emulsions from sodium salt that carry water into the final product; and the cost of replacing and disposing of the caustic solution which is required when the solution eventually becomes contaminated with toxins or catalyst poisons extracted from the distillate.

Other methods that employ organic bases to supply the basic medium have their own problems. Organic bases tend to be more expensive than aqueous caustic solutions due to the greater cost of such organics over aqueous caustic. If organic bases such as tetra-alkyl guanidines are used without an additional aqueous phase, they must be added in proportion to the amount of mercaptan contained in the sour distillate, increasing the cost of their use. When composited on a fixed bed with a metal chelate catalyst, the amount of base becomes depleted as the treatment of sour distillate proceeds. Alternatively, the organic base may be incorporated in aqueous solutions, in which case they are used as the caustic solution in practicing such methods. Thus, while the prior art has examined many ways to accommodate the problems caused by using organic or inorganic bases, no method is known that does not require the use of base in addition to the metal chelate catalyst.

SUMMARY OF THE INVENTION

It is the object of this invention to provide a novel catalyst for the sweetening of sour petroleum distillates, that does not require the use of a basic agent with said catalyst. This novel oxidation catalyst consists of an oxometallo chelate compound, said compound having two axial ligands. The first axial ligand is an oxygen atom, and the second axial ligand can be any of several radical groups, but typically is an alkoxy radical. The first and second axial ligands occupy positions on the metal atom adjacent to said chelate and opposite to each other. Said ligands are referred to as "axial" ligands because their positions in said compound may be thought of as forming an axis passing through the plane of the metal atom and the chelate. The catalyst is preferably composited on a solid inert granular support such as charcoal or a refractory oxide such as alumina or silica. By use of this novel catalyst composite, it has been discovered that the addition of basic agents to the sweetening process becomes unnecessary, and all the aforesaid disadvantages of using basic agents are avoided.

DETAILED DESCRIPTION OF THE INVENTION

The oxometallo chelate compound of the present invention is represented by the formula MO(Pn)X, where:

M represents a metal atom,

O represents the first axial ligand and is an oxygen atom double-bonded to the metal atom, (Pn) represents a tetradentate chelate, and X represents the second axial ligand, which is a radical group single-bonded to the metal atom.

Suitable metals for the compound are those from the group consisting of molybdenum, tungsten, chromium, vanadium, niobium, tantalum, manganese, rhenium, polonium, antimony, bismuth, praesodymium, neodymium, promethium, and uranium, as well as the metalloids selenium and tellurium. The preferred metals are molybdenum and tungsten, with molybdenum especially preferred.

The chelate may be selected from a large variety of chelates well known to the art, such as phthalocyanines and substituted phthalocyanines as described in U.S. Pat. No. 2,988,500; or porphyrins or substituted porphyrins as described in U.S. Pat. No. 2,966,453; or tetrapyridinoporphyrazines as described in U.S. Pat. No. 3,980,582; corrinoid chelates as described in U.S. Pat. No. 3,252,892; or other macrocyclic chelates such as Schiff bases, and the like. Dimeric or polymeric chelates such as polyporphyrins may also be used. The preferred chelates are substituted phthalocyanines such as phthalocyanine sulfonate. Substituted porphyrins such as tetraphenyl porphyrin are also preferred chelates.

The second axial ligand, X, is a radical group single-bonded to the metal such as an aliphatic or aromatic alkoxo radical (.OR); hydroxo radical (.OH); fluoro, chloro, bromo, or iodo radical; cyano, thiocyanato, isocyanato, or hydroperoxo radical; bisulfato, bicarbonato, nitrato, chlorato, perchlorato, or bisulfito radical; a primary aromatic or aliphatic amido radical; a secondary aromatic or aliphatic amido radical; a secondary aliphatic and aromatic radical; an acid phosphato radical; or an unsubstituted amido radical (.NH$_2$). Imidazolo radicals, and substituted Imidazolo radicals may also be used. The preferred axial ligand X is a small chain aliphatic alkoxo radical such as methoxo, ethoxo, propoxo radicals and the like, or the simple hydroxo radical.

The axial ligand X may also be bound to the chelate by means of suitable straight chain or other chemical group, e.g., an alkoxo ligand with a straight chain aliphatic group consisting of from 5 to 12 carbon atoms bound to the chelate such as on one of the phenyl rings of tetraphenyl porphyrin. It may be desirable to attach the ligand in this manner to the chelate since the ligand tends to be rather labile and may become displaced in the practice of the invention. In the event that the axial ligand X is displaced, the catalyst will still be able to function, although somewhat less effectively. In such case the catalyst will incorporate entrained impurities in the petroleum distillate such as alcohols, phenols, or water, and will convert them to alkoxo, phenoxo or hydroxo radical ligands in the axial position. This will occur even if the entrained impurity is present in very low concentrations.

This, an example of the preferred oxometallo chelate compound would be MoO(C$_{32}$N$_8$H$_{15}$(SO$_3$H))OCH$_3$, oxomethoxo(phthalocyanato-4-sulfonic acid)molybdenum. This is an example using a substituted phthalocyanine chelate, and has the following structure:

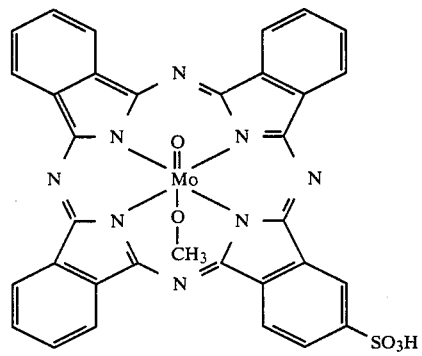

It should be remembered that the oxo and methoxo ligands are perpendicular to the plane of the molybdenum and the phthalocyanine atoms.

The catalyst can be generated in situ from related compounds. Thus MO$_2$(Pn) can be reduced to MO(Pn)X in the presence of mercaptans and entrained HX impurities. MO(Pn) can be oxidized to MO(Pn)X in the presence of air and entrained HX impurities. MO(Pn)-O-(Pn)MO can be cleaved to MO(Pn)OH and MO(Pn)X by entrained HX. Other similar compounds also will be converted to MO(Pn)X under the conditions prevalent in the sweetening process, namely the presence of air, mercaptans, and other impurities. The resting state of the compound in the presence of air is MO(Pn)X.

The oxometallo chelate compound is best used as a catalyst for petroleum sweetening by first supporting it on an inert high surface area solid. This practice is well known in the prior art and is described in U.S. Pat. No. 2,988,500 and in U.S. Pat. No. 4,087,378. Suitable solid supports should be inert to and insoluble in the petroleum products being sweetened. A preferred type of support is activated charcoal, derived from the destructive distillation of wood, peat, lignite, or nut shells, etc., and treated by heat or chemicals so that it is highly porous with increased adsorbent capacity. Other preferred solid supports are the refractory inorganic oxides, which may be syntheticly prepared or obtained naturally. Examples of such supports are alumina, silica, boria, zirconia, zeolites, clays, pumice, kieselguhr, etc., and mixed supports such as alumina/silica and the like. The oxometallo chelate compound is impregnated upon the support by dissolving or dispersing it in a suitable solvent such as methanol or ethanol or other alcohol, and then causing the support to be immersed in the solution or dispersion until the chelate compound is absorbed. The solvent alcohol is then removed by evaporation, or decantation or other suitable means.

The catalyst may be employed in the sweetening of petroleum the same manner as current oxidation catalysts discussed in the above description of the prior art, except that no additional basic agents are required.

Such sweetening methods are well explained in U.S. Pat. No. 2,988,500. Other aspects of such prior sweetening methods such as the admixing of air or oxygen or oxygen—inert gas mixtures, or the use of mild temperatures from 20° C. to 50° C. or higher, or the use of mild pressures such as 1 atmosphere or higher, and related aspects will be unchanged in the practice of the present invention. The catalyst of the present invention works best when the sour petroleum feed stream is neither unduly acidic nor unduly basic, although the catalyst will function within a fairly broad range of acidity. The catalyst is effective in the presence of varying quantities of water, including the presence of a separate aqueous phase, provided it is not unduly acidic or basic.

EXAMPLE I

MoO(TPP)OEt, oxoethoxotetraphenylporphinato molybdenum, can be prepared in good yield from MoOCl$_3$ and H$_2$TPP as follows: MoOCl$_3$ (5 parts) and H$_2$TPP (5 parts) are placed in a dry flask fitted with a reflux condenser and adapters so that the reaction can be performed under insert atmosphere. Carefully dried mesitylene (300 parts) and 2,6-dimethylpyridine (2 parts) are added and the reaction is refluxed for 12 hours. The crude product is recovered in the presence of air. The mesitylene is recovered first by distillation under reduced pressure. The crude product residue is dissolved in dichloromethane and washed alternately with dilute aqueous KOH (ca 0.5N) and dilute aqueous HCl (ca 1N). Ethanol (10 parts) is added to the solution, and the solvent is stripped by evaporation. The dark blue solid product is sufficiently pure for catalytic purposes, but can be purified further by chromatography on neutral alumina with dichloromethane as solvent. Yields are excellent, usually 70% to 80% based on unreacted H$_2$TPP.

EXAMPLE II

MoO(Pc)OEt, oxoethoxophthalocyanato molybdenum, can be prepared in good yield from MoOCl$_3$ and o-C$_6$H$_4$(CN)$_2$ as follows: MoOCl$_3$ (5 parts) and orthodicyanobenzene (10 parts) are placed in a dry flask fitted with a reflux condenser and adapters for an inert atmosphere. Distilled dimethylformamide (DMF) (400 parts) is added and the reaction is refluxed under inert gas for 12-16 hours. The crude product is recovered by vacuum distillation of the DMF, followed by washing the blue/black residue with water, ethanol, and dichloromethane. The product is sufficiently pure for catalytic purposes, but can be purified by chromatography on silica with dimethylsulfoxide/ethanol in ca 9:1 ratio. Yields are good, usually 50% based on dicyanobenzene.

Particularly preferred chelates are derivatives of phthalocyanine, especially the mono and di-sulfonated derivatives. Such derivatives can be obtained from an unsubstituted phthalocyanine chelate by standard sulfonation techniques, such as treating the compound with fuming sulfuric acid. Extended treating with oleum will afford tri- and tetrasulfonated phthalocyanine derivatives. Another preferred phthalocyanine derivative is the carboxylated derivative, which can be obtained by treating the phthalocyanine with phosgene and aluminum chloride, followed by hydrolysis of the acid chloride initially obtained.

EXAMPLE III

MoO(Pc(SO$_3$Na)$_4$)OMe, oxomethoxo(tetrasulfophthalocyanato)molybdenum, tetrasodium salt, can be obtained from MoO(OH)$_3$, urea, and Na$_3$C$_6$H$_3$(CO$_2$)$_2$SO$_3$.2H$_2$O as follows: MoO(OH)$_3$ (7 parts) urea (30 parts), and 4-sulfophthalic acid, trisodium salt, (20 parts) are finely ground into powders and mixed thoroughly with each other. The mixture is placed in a large flask and is heated for 3 hours at sufficient temperature to melt the reactants, ca 160° C. The crude product is recovered by dissolving the black residue in water and filtering it. Methanol is added to the filtrate, and the solvent is stripped by evaporation.

EXAMPLE IV

A catalyst is supported an a solid support and tested for petroleum sweetening as follows: MoO(Pc(SO$_3$H))OEt, oxoethoxo-(phthalocyanto-4-sulfonic acid) molybdenum (150 mg) is dissolved in 150 ml ethanol. The solution is passed through a column containing about 100 cc of activated charcoal particles. The granular charcoal has a particle size of 30-40 mesh, but smaller particles up to about 200 mesh may be used. The solution is collected off the bottom of the column and is reintroduced at the top of the column until the color of the solution dissipates, indicating that the compound has been adsorbed. The solvent is drained and the column is dried in an oven at 100° C. for an hour.

A synthetic solution of sour kerosene is prepared by adding butyl mercaptan (0.5 ml) to a commercially available sweet kerosene (500 ml) to give about 350 ppm mercaptan sulfur. The kerosene is passed through the column with entrained air (saturated), at a LHSV of about 3-4. Samples taken at the bottom of the column throughout the run are doctor negative.

While a number of particular forms of the invention have been disclosed, it will be apprent that various modifications and improvements thereto can be made without departing from the spirit and scope of the invention. Accordingly, it is not intended that the invention be limited by the above description, but that the invention comprehend all such modifications and improvements which are apparent to one skilled in the art from the above description.

I claim as my invention:

1. A catalyst composite "for oxidizing mercaptans to disulfides or inorganic sulfides to elemental sulfur consisting of a compound adsorbed onto a solid support material" having the general formula MO(Pn)X for the adsorbed compound, wherein;

M is a metal or metalloid selected from the group consisting of molybdenum, tungsten, chromium, vanadium, niobium, tantalum, manganese, rhenium, polonium antimony, bismuth, praesodymium, neodymium, promethium, uranium, selenium and tellurium;

O is an oxygen atom;

(Pn) is a chelate selected from the group consisting of phthalocyanines, sulfonated phthalocyanines, carboxylated phthalocyanines, polyphthalocyanines, porphyrins, tetra-arylporphyrins, polyporphyrins, corrins, tetra-pyridinoporphyrazines;

X is a radical group single-bonded to the metal atom selected from the group consisting of aliphatic and aromatic alkoxo radicals, fluoro, chloro, bromo, iodo radicals, cyano, thiocyanato, isocyanato, hydroxo, hydroperoxo, bisulfato, bicarbonato, nitrato, chlorato, perchlorato, bisulfito radicals, primary and/or secondary aliphatic or aromatic amido radicals, unsubstituted amido, acid phosphato, imidazolo radicals.

2. A catalyst composite as recited in claim 1 wherein the solid support material is selected from the group consisting of activated charcoal from wood, peat, lignite, nut shells; or silica, alumina, boria, zirconia, zeolites, clays, pumice, kieselguhr or mixed alumina/silica materials.

3. A catalyst composite as recited as claim 1, wherein said axial ligand X is simultaneously bonded through different atoms to said metal atom and to said chelate.

4. A catalyst composite for oxidizing mercaptans to disulfides or inorganic sulfides to elemental sulfur having a compound of general formula MO(Pn)X adsorbed onto a solid material support wherein;

M is a metal selected from the group consisting of molybdenum and tungsten;

O is an oxygen atom;

(Pn) is a chelate from the group consisting of sulfonated phthalocyanines and tetra-aryl porphyrins;

X is a radical group selected from the group consisting of short chain aliphatic alkoxo radicals and hydroxo radicals;

and the ligands O and X are axially disposed relative to the plane of the metal chelate.

5. A catalyst composite as recited in claim 2 wherein said compound is MoO(TPP)OEt, oxoethoxotetraphenylporphyrinato molybdenum.

6. A catalyst composite as recited in claim 2 wherein said compound is MoO(Pc)OEt, oxoethoxophthalocyanato molybdenum.

7. A catalyst composite as recited in claim 2 wherein said compound is $MoO(Pc(SO_3H))OEt$, oxoethoxo(phthalocyanato-4-sulfonic acid) molybdenum.

8. A catalyst composite as recited in claim 2 wherein said compound is $MoO(Pc(SO_3Na)_4)OEt$, tetrasodium oxoethoxo(tetrasulfophthalocyanato) molybdenum.

* * * * *